United States Patent [19]

Nakada

[11] Patent Number: 4,690,911

[45] Date of Patent: Sep. 1, 1987

[54] ZIRCONIA CERAMICS AND PROCESS FOR PRODUCING THE SAME

[75] Inventor: Takao Nakada, Hitachi, Japan

[73] Assignee: Hitachi Chemical Co., Ltd., Tokyo, Japan

[21] Appl. No.: 662,566

[22] Filed: Oct. 19, 1984

[30] Foreign Application Priority Data

Oct. 20, 1983 [JP] Japan .................................. 58-196705
Nov. 16, 1983 [JP] Japan .................................. 58-215836

[51] Int. Cl.$^4$ ........................ C04B 35/48; C04B 35/49
[52] U.S. Cl. ..................................... 501/105; 501/103; 501/152; 264/66
[58] Field of Search ....................... 501/105, 103, 152; 264/66

[56] References Cited

U.S. PATENT DOCUMENTS

| | | | |
|---|---|---|---|
| 4,316,964 | 2/1982 | Lange | 501/105 |
| 4,525,464 | 6/1985 | Claussen et al. | 501/103 |
| 4,542,110 | 9/1985 | Nakada et al. | 501/103 |
| 4,588,655 | 5/1986 | Kushner | 501/105 |
| 4,599,270 | 7/1986 | Rangaswamy et al. | 501/152 X |
| 4,610,967 | 9/1986 | Imanishi et al. | 501/103 |

FOREIGN PATENT DOCUMENTS

| | | | |
|---|---|---|---|
| 0096519 | 12/1983 | European Pat. Off. | 501/105 |
| 0121969 | 9/1980 | Japan | 501/105 |

OTHER PUBLICATIONS

Pol Duwez et al, "Phase Relationships in the System Zirconia-Ceria", J. American Ceramic Soc., vol. 33, No. 9, pp. 274-283, 1950.

*Primary Examiner*—William R. Dixon, Jr.
*Assistant Examiner*—A. Knab
*Attorney, Agent, or Firm*—Antonelli, Terry & Wands

[57] ABSTRACT

A sintered body of zirconia ceramic comprising 74 to 87% by weight of $ZrO_2$ and 26 to 13% by weight of $CeO_2$, and 0.1 to 20% by weight of $Al_2O_3$ and 99.9–80% by weight of $ZrO_2$—$CeO_2$ in the form of tetragonal crystals with 20% by weight or less of monoclinic and/or cubic crystals, is excellent in mechanical strength, were resistance and thermal stability.

17 Claims, No Drawings

ZIRCONIA CERAMICS AND PROCESS FOR PRODUCING THE SAME

BACKGROUND OF THE INVENTION

This invention relates to a zirconia ceramic (sintered body) excellent in durability at high temperatures and usable as mechanical parts and a process for producing the same.

Ceramics containing zivconium oxide as a main component have been used as refractory heat insulation materials, since these ceramics are low in thermal conductivity and difficult in thermal deformation. Recently one or more stabilizing agents such as yttrium oxide, calcium oxide and magnesium oxide in small amounts are solid solubilized in zirconium oxide for by far improving flexural strength, hardness so as to be used as cutting tools. But in order to obtain ceramics with high strength and high hardness, it is necessary to use very fine raw material powders produced by gas-phase or liquid-phase reactions, and to limit the sintering temperature to a narrow range. Such limited conditions are naturally necessary since the size and kind of crystals included in sintered bodies should be limited. Thus, the production of large-sized products is very difficult and even if produced, the resulting products are very expensive, which results in limiting their use.

Further, the thus produced sintered bodies are thermally unstable. For example, change in crystal system and lowering in strength take place during a long use at 200°-500° C. in the case of a zirconium oxide sintered body solid solubilized with yttrium oxide and at near 1000° C. in the case of a zirconium oxide sintered body solid solubilized with calcium oxide, which results in limiting the use at high temperatures. Particularly in the case of industrial parts, when they are subject to precise cutting workings such as diamond grinding, and the like, the worked side brings about great strain and easily brings about crystal change due to the heat produced, which results in lowering of strength. On the other hand, when a large amount of stabilizing agent is solid solubilized, thermal stability can be obtained but the strength is lowered, which results in making it unsuitable to use these sintered bodies as mechanical parts.

SUMMARY OF THE INVENTION

It is an object of this invention to provide a zirconia ceramic excellent in mechanical strength, wear resistance and thermal stability and a process for producing the same.

This invention provides a ceramic comprising zirconium oxide, cerium oxide and aluminum oxide in the form of tetragonal crystals with 20% by weight or less of monoclinic and/or cubic crystals, the proportion of zirconium oxide and cerium oxide being 74 to 87% by weight of zirconium oxide and 26 to 13% by weight of cerium oxide, and the proportion of zirconium oxide-cerium oxide and aluminum oxide being 99.9 to 80% by weight of zirconium oxide-cerium oxide and 0.1 to 20% by weight of aluminum oxide.

This invention provides a process for producing a ceramic comprising zirconium oxide, cerium oxide and aluminum oxide in the form of tetragonal crystals with 20% by weight or less of monoclinic and/or cubic crystals, which comprises heat treating a mixture of 74 to 87% by weight of zirconium oxide powder and 13 to 26% by weight of cerium oxide powder at a temperature of 1000 to 1500° C. to give an intermediate mixture, adding 0.1 to 20% by weight of an aluminum compound (in terms of the weight of $Al_2O_3$) to 80 to 99.9% by weight of the intermediate mixture, mixing, grinding and molding the resulting mixture, and sintering the molded mixture at a temperature of 1500° to 1700° C.

DESCRIPTION OF THE PREFERRED EMBODIMENTS

The zirconia ceramic of this invention contains monoclinic and/or cubic crystal system in an amount of 20% by weight or less based on the total crystal system. When a cubic crystal system (cubic zirconium oxide which may include cerium oxide) is not contained and only monoclinic zirconium oxide (which may include cerium oxide) is contained in the crystals, great strain or micro-cracks are produced. Furthermore, the mechanical strength is lowered rapidly when the crystal amount is large. In such a case, the amount of monoclinic zirconium oxide is preferably 10% by weight or less. On the other hand, when monoclinic zirconium oxide is not contained and only cubic zirconium oxide is contained, the production of crystals can be examined by X-ray diffraction method. In such a case, thermal stability is good but mechanical stability is lowered with an increase of the cubic zirconium oxide content in the crystals. In order to obtain desirable strength for mechanical parts, it is preferable to make the cubic zirconium oxide content 20% by weight or less. Further, the presence of both monoclinic zirconium oxide and cubic zirconium oxide in the same sintered body is not preferable due to the occurrence of nonuniform mixing of zirconium oxide and cerium oxide so as to cause thermal unstability and lowering in mechanical strength. For the reasons mentioned above, the content of monoclinic and/or cubic zirconium oxide should be 20% by weight or less.

As to the chemical composition of the sintered body of zirconia ceramic of this invention, the proportions of zirconium oxide ($ZrO_2$) and cerium oxide ($CeO_2$) are 74 to 87% by weight of $ZrO_2$ and 26 to 13% by weight of $CeO_2$, and the proportions of $ZrO_2$—$CeO_2$ and aluminum oxide ($Al_2O_3$) are 99.9 to 80% by weight of $ZrO_2$—$CeO_2$ and 0.1 to 20% by weight of $Al_2O_3$; preferably $ZrO_2$ 73.9–86.9%, $CeO_2$ 13.0–26.0% and $Al_2O_3$ 0.1–20% by weight.

The amount of 26 to 13% by weight of $CeO_2$, preferably 16 to 21% by weight of $CeO_2$ in the intermediate mixture of $ZrO_2$—$CeO_2$, is determined by various experiments. When various sintered bodies are produced from various kinds of mixtures of $ZrO_2$ and $CeO_2$, or mixtures of $ZrO_2$, $CeO_2$ and $Al_2O_3$, mechanical strength increases rapidly when the $CeO_2$ content is 11% by weight or more, preferably 13.0% by weight or more and reaches the maximum at about 17% by weight to give flexural strength of about 100 kg/mm$^2$, which value is equivalent to the best value of known Y$_2$O$_3$—ZrO$_2$ ceramics. With a further increase of the CeO$_2$ content, the strength decreases gradually and flexural strength is lowered to about 50 kg/mm$^2$ (not high strength) when the content of CeO$_2$ is more than 26.0% by weight.

Thermal stability of sintered bodies is determined as follows. A thermal expansion rate is measured by heating a sample cut from a sintered body by using a diamond cutter from room temperature to 1300° C. at a rate of 2° C./min, then cooling the sample from 1300° C. to room temperature at a rate of 2° C./min. Change of crystal forms is measured by placing a sample in an electric furnace which can be heated from 300° to 1300° C. with an interval of 100° C. for 3000 hours by using an X-ray diffraction method. Flexural strength is measured by a conventional three-point bending test.

As a result, sintered bodies with the CeO$_2$ content of 13% by weight or more change almost linearly as to the thermal expansion rate either raising the temperature or lowering the temperature with no difference and have flexural strength of 50 kg/mm$^2$ or more. When the CeO$_2$ content is lower than 11% by weight, the flexural strength is lowered extremely. Further, when the CeO$_2$ content is about 10% by weight, there takes place a volume change at about 3000° C. rapidly and the flexural strength becomes almost 0 kg/mm$^2$.

Further, when the CeO$_2$ content is lower than 11 to 16% by weight, there is admitted the production and increase of monoclinic crystals at a diamond ground face in several hundreds hours at 500° C. or lower, but no further change is admitted with the lapse of the test time. There is also admitted no significant difference in the change of mechanical strength during the test time.

The ZrO$_2$ content in the final sintered body can be changed from 59.2% by weight to 86.9% by weight. Considering properties of the sintered body, the content of 73.9 to 86.9% by weight is preferable because of higher strength and better thermal stability.

Al$_2$O$_3$ is effective for lowering the sintering temperature. But since the thermal expansion rate of Al$_2$O$_3$ is $6 \times 10^{-6}/$° C. which is clearly larger than the value of $10 \times 10^{-6}$ of ZrO$_2$, the use of too much Al$_2$O$_3$ is not preferable due to the production of internal strains, particularly in the case of parts subjected to heat cycles. Further, too much content of Al$_2$O$_3$ raises the possible sintering temperature undesirably high, and makes zirconia crystals grosser and variation of mechanical strength larger.

Therefore, the upper limit of Al$_2$O$_3$ content is 20% by weight.

The sintered body of zirconia ceramic of this invention may contain SiO$_2$, TiO$_2$, Fe$_2$O$_3$ and the like as impurities in an amount of 2% by weight or less.

Heretofore, in order to produce zirconia ceramics improved in flexural strength, etc., it was necessary to use fine powders prepared by co-precipitation from an aqueous solution of a water-soluble zirconium oxide salt and a stabilizing agent by pH adjustment. When zirconium oxide powder usually used in the production of ceramics was used, higher sintering temperature was necessary. Further, since tetragonal crystals produced in ceramics grew, there easily took place conversion of crystal forms and converted into monoclinic crystals during a cooling step after sintering, which resulted in producing cracks on the ceramics due to the volume change. In order to prevent the cracks, very fine zirconium oxide powder was used so as to lower the sintering temperature at which temperature the growth of crystals was difficult. But the process for producing such a very fine zirconium oxide powder was complicated and expensive. Further yttrium oxide which was used as stabilizing agent was also expensive. Therefore the price of the raw materials was 20 times or more as high as the price of aluminum oxide usually used as raw materials for structural materials. Because of such a high price, the use of these ceramics was very limited. Further, there were also many troubles in that since very fine powder was used, filling of the raw materials at the time of molding was very difficult, since the sintering shrinkage at the time of sintering of a molded article was large, cracks were easily produced due to variation in shrinkage, these troubles were remarkable in the case of large-sized products, and even if products could be obtained, cracks were sometimes included interior of the products. On the other hand, since small crystals were produced, crystal phase conversion was difficultly occurred, but when stored at 300° C. or lower for a long period of time, there gradually took place the crystal phase conversion to rapidly lower the strength.

According to this invention, these defects of prior art processes are overcome and sintered bodies of zirconia ceramics excellent in mechanical strength, wear resistance and thermal stability can be produced with low cost and without bringing about crystal phase conversion.

The sintered body of zirconia ceramic is produced by heat treating a mixture of 74 to 87% by weight of zirconium oxide powder and 13 to 26% by weight of cerium oxide powder at a temperature of 1000 to 1500° C. to give an intermediate mixture, adding 0.1 to 20% by weight of aluminum compound (in terms of the weight of Al$_2$O$_3$) to 80 to 99.9% by weight of the intermediate mixture, mixing, grinding and molding the resulting mixture, and sintering the molded mixture at a temperature of 1500° to 1700° C.

The raw material powders are not required to be very fine powders and conventionally used zirconium oxide powder, cerium oxide powder and aluminum compound powder such as alumina powder for producing ceramics can be used.

Further, since the aluminum compound is used as sintering aid, the sintering temperature range can be broadened from relatively low to high sintering temperatures.

In order to produce the intermediate mixture, 74 to 87% by weight of zirconium oxide powder and 13 to 26% by weight of cerium oxide powder are used. When the amount of zirconium oxide powder is less than 74% by weight and the amount of cerium oxide powder is more than 26% by weight, a zirconia ceramic with high strength cannot be obtained. On the other hand, when the amount of zirconium oxide powder is more than 87% by weight and the amount of cerium oxide powder is less than 13% by weight, the stabilization of crystals becomes insufficient and the conversion to monoclinic crystals takes place during cooling after the sintering to an unallowable extent, so that the resulting ceramic cannot be used due to cracks produced. Considering the improvement in strength and thermal stability, the use of 79 to 84% by weight of zirconium oxide powder and 16 to 21% by weight of cerium oxide powder is preferable.

The temperature for the heat treatment is 1000° to 1500° C. When the temperature is lower than 1000° C., effects for the heat treatment are reduced to lower the bulk density of the molded body, to make the sintering difficult, and the like. On the other hand, when the temperature is higher than 1500° C., the grinding in the later stage becomes difficult.

The amount of aluminum compound to be added to the intermediate mixture is 0.1 to 20% by weight (in terms of the weight of $Al_2O_3$) for 80 to 99.9% by weight of the intermediate mixture. If the amount of aluminum compound is outside the above-mentioned range, the sintering temperature becomes higher to lower the mechanical strength. When the amount of aluminum compound is 0.1 to 5% by weight (in terms of the weight of $Al_2O_3$), the sintering temperature can favorably be lowered to broaden the possible sintering temperature range, to reduce the variation in strength and to improve the stability with the lapse of time.

As the aluminum compound, there can be used conventionally used ones such as aluminum oxide. It is also possible to use those obtained by dissolving aluminum hydroxide, aluminum chloride, or the like together with aluminum oxide in a solvent and dispersed or those obtained by adding clays to aluminum oxide.

Then, the intermediate mixture and the aluminum compound are mixed, ground and molded by conventional processes.

The resulting molded body (mixture) is sintered at a temperature of 1500° to 1700° C. When the temperature is lower than 1500° C., the ceramic cannot be sintered, while when the temperature is higher than 1700° C., there cause creeps in the molded body.

In this invention, it is preferable to use the raw material powders of 99% or more in purity considering the strength and variation of strength of the sintered body.

Zirconium oxide usually contains several percents or more of hafnium oxide, but since hafnium oxide shows almost the same performance as zirconium oxide, it is not treated as an impurity in this invention.

According to the process of this invention, since no special apparatus and conditions are required and the sintering is easier than that for conventional fine ceramics due to the broadened sintering temperature range, even large-sized product can be produced unexpensively with lower percent defectives.

Further, since the sintered body of zirconia ceramic of this invention is excellent in strength and durability at high temperatures, it can be used as mechanical parts such as engine parts, heating appliance, gas burner nozzles, dust nozzles and the like. Further, it is hardly suffered from diamond grinding and it can be shaped into large-sized products easily.

This invention is illustrated by way of the following Examples.

EXAMPLE 1

Zirconium oxide powder (EP grade, mfd. by Daiichi Kigenso Co., Ltd.) and cerium oxide powder (purity 99.9%, mfd. by Shin-etsu Chemical Industry Co., Ltd.) were weighed as shown in Table 1 and wet milled in a ball mill (100 parts by weight of the oxide mixture, 85 parts by weight of water and 200 parts by weight of balls) until the average particle size became 0.6 μm or less. After drying, the mixture was heat treated at 1250° C. for 1 hour to give an intermediate mixture. To the intermediate mixture, aluminum oxide powder in an amount as shown in Table 1 was added and the resulting mixture was wet milled in a ball mill until the average particle size became 0.55 μm. To the ground paste, 0.5% by weight of poly(vinyl alcohol) (PVA) and wax were added and spray dried to give a molding powder. The molding powder was molded under a pressure of 1 ton/cm² using a rubber press and sintered at 1600° C. for 1 hour to give a sintered body.

The sintered body was ground on 4 sides by using a diamond grinding wheel (#200 and #800) to give a sample of 4×3×40 mm. Using this sample, various tests as listed in Table 1 were conducted. The amount of crystal forms was measured by using an X-ray diffraction device on the sintered surfaces, the ground surfaces by diamond and ground powder. In the case of tetragonal-cubic crystals, the quantitative measurement was conducted on the (022) plane for the tetragonal crystals and on the (220) plane for the cubic crystals. Further, in the case of tetragonal-monoclinic crystals, the quantitative measurement was conducted on the (111) plane for the tetragonal crystals and on the (11) plane and (111) plane for the monoclinic crystals. The components included therein were measured by using a fluorescent X-ray analysis device. The thermal expansion rate was measured by using an autographic thermal analysis device.

The results are shown in Table 1.

TABLE 1

| Run No. | Composition of ceramic | | | Thermal expansion rate 25–900° C. |
|---|---|---|---|---|
|  | $ZrO_2$ (wt %) | $CeO_2$ (wt %) | $Al_2O_3$ (wt %) |  |
| *1 | 90.1 | 9.2 | 0.7 | $3.1 \times 10^{-6}$** |
| 2 | 86.0 | 13.1 | 0.9 | $10.3 \times 10^{-6}$ |
| *3 | 84.1 | 15.9 | 0 | $11.4 \times 10^{-6}$ |
| 4 | 83.8 | 15.2 | 1.0 | $11.7 \times 10^{-6}$ |
| 5 | 81.2 | 18.4 | 0.4 | $11.6 \times 10^{-6}$ |
| 6 | 80.8 | 17.7 | 1.3 | $11.5 \times 10^{-6}$ |
| 7 | 73.4 | 16.6 | 9.3 | $10.9 \times 10^{-6}$ |
| 8 | 65.1 | 14.7 | 19.9 | $10.5 \times 10^{-6}$ |
| *9 | 56.8 | 12.8 | 29.6 | $9.8 \times 10^{-6}$ |
| 10 | 73.8 | 21.2 | 4.8 | $11.4 \times 10^{-6}$ |
| 11 | 61.7 | 18.6 | 19.4 | $10.6 \times 10^{-6}$ |
| 12 | 73.1 | 26.4 | 0.4 | $11.3 \times 10^{-6}$ |
| *13 | 69.3 | 30.1 | 0.5 | $11.0 \times 10^{-6}$ |

| Initial flexural | Initial content of | Flexural strength after stored at | Content of tetragonal crystal after stored |

TABLE 1-continued

| strength (kg/mm$^2$) | tetragonal crystals (%) | 700° C. for 3000 hrs (kg/mm$^2$) | at 700° C. for 3000 hrs (%) |
|---|---|---|---|
| 0 | 3 | 0 | 4 |
| 46.6 | 89 | 43.1 | 87 |
| 68.3 | 96 | 66.8 | 93 |
| 93.4 | 94 | 91.6 | 93 |
| 79.6 | 100 | 80.1 | 100 |
| 76.3 | 100 | 74.3 | 100 |
| 72.8 | 100*** | 70.5 | 100 |
| 66.1 | 100*** | 67.7 | 100 |
| 43.4 | 100 | 44.5 | 100 |
| 73.8 | 96 | 72.9 | 95 |
| 52.2 | 85 | 53.6 | 88 |
| 40.3 | 80 | 37.3 | 81 |
| 28.3 | 67 | 28.8 | 71 |

Note
*Comparative Examples
**An inflextion point at 550° C.
***Crystals of α-Al$_2$O$_3$ are partly present.

As is clear from Table 1, the sintered bodies in the range of this invention are excellent in thermal stability and mechanical strength. Particularly, the composition of Run No. 4 is suitable for general machines (e.g. mechanical seals, cutlery) and the compositions of Run Nos. 5, 6 and 7 are suitable for high-temperature uses, e.g. engines.

Observation by an electron microscope showed that crystal systems of the sintered bodies of this invention were greatly different from micro-crystals of yttrium oxide-zirconium oxide system and giant crystals of magnesium oxide-zirconium oxide system. That is, the crystals grew densely and uniformly. The crystal size at a ruptured face after measuring the flexural strength was 1-5 μm, angular crystals were arranged without spaces, and the presence of pores was observed. With an increase of the CeO$_2$ content, gross cubic crystals were observed and the presence of pores in the crystals was admitted. It was confirmed that there was a remarkably high correlation between the mechanical strength and the crystal system.

EXAMPLE 2

Zirconium oxide powder (EP grade, mfd. by Daiichi Kigenso Co., Ltd.) and cerium oxide powder (purity 99.9%, mfd. by Shin-etsu Chemical Industry Co., Ltd.) were weighed as shown in Table 2 and wet milled in a ball mill (100 parts by weight of the oxide mixture, 85 parts by weight of water and 200 parts by weight of balls) until the average particle size became 0.6 μm or less. After drying, the mixture was heat treated at 1250° C. for 1 hour to give an intermediate mixture. To the intermediate mixture, aluminum oxide (Al 160, a tradename, mfd. by Showa Aluminum Co., Ltd.) in amounts as shown in Table 2 was added and the resulting mixture was wet milled in a ball mill (100 parts by weight of the resulting mixture, 75 parts by weight of water and 200 parts by weight of balls) until the average particle size became 0.55 μm. To the ground paste, 0.5% by weight of poly(vinyl alcohol) (PVA) and wax were added and spray dried to give a molding powder. The molding powder was molded under a pressure of 1 ton/cm$^2$ using a rubber press and sintered at a temperature as shown in Table 2 for 1 hour to give a sintered body. The sintered body was subjected to various tests.

The flexural strength was measured by using a sample of 3×4×40 mm according to the three-point bending test with a span of 30 mm. An average value of 5 samples was shown in Table 2.

TABLE 2

| Run No. | Sintered body | | | | | |
|---|---|---|---|---|---|---|
| | Intermediate mixture | | Amount of Al$_2$O$_3$ added to intermediate mixture (wt %) | Sintering temp. (°C.) | Properties | |
| | ZrO$_2$ powder (wt %) | CeO$_2$ powder (wt %) | | | Flexural strength (kg/mm$^2$) | Content of monoclinic crystals (%) |
| *1 | 91.8 | 8.2 | 1.0 | 1600 | — | 63 |
| *2 | 89.2 | 10.8 | " | " | — | 33 |
| 3 | 86.6 | 13.4 | " | " | 48.7 | 10 |
| 4 | 84.0 | 16.0 | " | " | 94.6 | 2 |
| 5 | 81.5 | 18.5 | 0.1 | 1640 | 90.2 | 0 |
| 6 | " | " | 0.5 | 1600 | 101.1 | 0 |
| 7 | " | " | 5.0 | " | 86.6 | 0 |
| 8 | " | " | 10.0 | 1640 | 73.7 | 0 |
| 9 | " | " | 20.0 | " | 70.4 | 4 |
| *10 | " | " | 30.0 | "** | 37.3 | 13 |
| 11 | 79.0 | 21.0 | 1.0 | 1600 | 94.5 | 0 |
| 12 | 76.5 | 23.5 | " | " | 70.6 | 0 |
| 13 | 74.1 | 25.9 | " | " | 58.7 | 0 |
| *14 | 72.0 | 28.0 | " | " | 49.0 | 0 |
| *15 | 62.9 | 37.1 | " | " | 41.2 | 0 |
| 16 | 81.5 | 18.5 | 0.5 | 1500 | 89.4 | 0 |
| 17 | " | " | " | 1650 | 103.2 | 0 |
| 18 | " | " | " | 1700 | 94.4 | 0 |

Note
*Comparative Examples
**Not sintered.

What is claimed is:
1. A ceramic comprising a sintered body containing zirconium oxide, cerium oxide and aluminum oxide in the form of tetragonal crystals with 20% by weight or less of monoclinic and/or cubic crystals, the proportions of zirconium oxide and cerium oxide being 74 to 84% by weight of zirconium oxide and 26 to 16% by weight of cerium oxide, and the proportions of zirconium oxide-cerium oxide and aluminum ozide being 99.9 to 80% by weight of zirconium oxide-cerium oxide and 0.1 to 20% by weight of aluminum oxide.

2. A ceramic according to claim 1, wherein the proportions of zirconium oxide-cerium oxide-cerium and aluminum oxide is 95 to 99.9% by weight of zirconium oxide-cerium oxide and and 0.1 to 5% by weight of aluminum oxide.

3. A ceramic according to claim 1, wherein the proportions of zirconium oxide and cerium oxide is 79 to 84% by weight of zirconium oxide and 16 to 21% by weight of cerium oxide., 4. A process for producing a ceramic comprising a sintered body containing zirconium oxide, cerium oxide and aluminum oxide in the form of tetragonal crystals with 20% by weight or less of monoclinic and/or cubic crystals, which comprises:
   heat treating a mixture of 74 to 84% by weight of zirconium oxide powder and 16 to 26% by weight of cerium oxide powder at a temperature of 1000° to 1500° C. to give an intermediate oxide mixture,
   adding 0.1 to 20% by weight of aluminum compound in terms of the weight of aluminum oxide to 80 to 99.9% by weight of the intermediate oxide mixture,
   mixing, grinding and molding the resulting mixture, and
   sintering the molded mixture at a temperature of 1500° to 1700° C. to form said sintered body.

5. A process according to claim 4, wherein 0.1 to 5% by weight of aluminum compound in terms of the weight of aluminum oxide is added to 95 to 99.9% by weight of the intermediate mixture.

6. A process according to claim 4, wherein the intermediate mixture comprises 79 to 84% by weight of zirconium oxide and 16 to 21% by weight of cerium oxide.

7. A ceramic comprising a sintered body consisting essentially of zirconium oxide, cerium oxide and aluminum oxide in the form of tetragonal crystals with 20% by weight or less of monoclinic and/or cubic crystals; said sintered body being produced by heat treating a mixture consisting essentially of 74% to 84% by weight of zirconium oxide and 26 to 16% by weight of cerium oxide at a temperature of 1000° to 1500° C. to give an intermediate oxide mixture, by adding 0.1 to 20% by weight of at least one aluminum compound in terms of the weight of aluminum oxide to 80 to 99.9% by weight of the intermediate mixture, thereafter by mixing, grinding and molding the resulting mixture, and by sintering the molded mixture at a temperature of 1500° to 1700° C.

8. A ceramic according to claim 7, wherein 0.1 to 5% by weight of aluminum oxide is added to 95 to 99.9% by weight of the intermediate mixture.

9. A ceramic according to claim 7, wherein the heat-treated mixture consists essentially of 79 to 84% by weight of zirconium oxide and 16 to 21% by weight of cerium oxide.

10. A ceramic according to claim 7, wherein said sintered body includes up to 2% by weight of $SiO_2$, $TiO_2$ and $Fe_2O_3$ as impurities.

11. A process for producing a ceramic comprising a sintered body consisting essentially of zirconium oxide, cerium oxide and aluminum oxide in the form of tetragonal crystals with 20% by weight or less of monoclinic and/or cubic crystals, which comprises:
   heat treating a mixture consisting essentially of 74 to 84% by weight of zirconium oxide powder and 16 to 26% by weight of cerium oxide powder at a temperature of 1000° to 1500° C. to give an intermediate oxide mixture,
   adding 0.1 to 20% by weight of an aluminum compound in terms of the weight of aluminum oxide to 80 to 99.9% by weight of the intermediate oxide mixture,
   mixing, grinding and molding the resulting mixture, and
   sintering the molded mixture at a temperature of 1500° to 1700° C. to form said sintered body.

12. A process according to claim 11, wherein 0.1 to 5% by weight of the aluminum compound in terms of the weight of aluminum oxide is added to 95 to 99.9% by weight of the intermediate oxide mixture.

13. A process according to claim 11, wherein the intermediate oxide mixture consists essentially of 79 to 84% by weight of zirconium oxide and 16 to 21% by weight of cerium oxide.

14. A ceramic comprising a sintered body consisting of zirconium oxide, cerium oxide, aluminum oxide and impurities in the form of tetragonal crystals with 20% by weight or less of monoclinic and/or cubic crystals, the proportions of zirconium oxide and cerium oxide being 74 to 84% by weight of zirconium oxide and 26 to 16% by weight of cerium oxide, the proportions of zirconium oxide-cerium oxide and aluminum oxide being 99.9 to 80% by weight of zirconium oxide-cerium oxide and 0.1 to 20% by weight of aluminum oxide; and the proportions of impurities being up to 2% by weight of $SiO_2$, $TiO_2$ and $Fe_2O_3$ based on the weight of the sintered body.

15. A ceramic according to claim 7, wherein the heat-treated mixture consists of 79 to 84% by weight of zirconium oxide and 16 to 21% by weight of cerium oxide.

16. A process according to claim 11, wherein the intermediate oxide mixture consists of 79 to 84% by weight of zirconium oxide and 16 to 21% by weight of cerium oxide.

17. A process according to claim 16, wherein 0.1 to 5% by weight of the aluminum compound interms of the weight of aluminum oxide is added to 95 to 99.9% by weight of the intermediate oxide mixture.

* * * * *